United States Patent [19]

Saadeh et al.

[11] Patent Number: 5,283,905
[45] Date of Patent: Feb. 1, 1994

[54] POWER SUPPLY FOR COMPUTER SYSTEM MANAGER

[75] Inventors: Said S. Saadeh; Paul R. Fulton, both of Plano; Thomas J. Hernandez, Houston; Arthur D. Heald, Plano; Richard A. Stupek, Houston, all of Tex.

[73] Assignee: Compaq Computer Corporation, Houston, Tex.

[21] Appl. No.: 719,394

[22] Filed: Jun. 24, 1991

[51] Int. Cl.$^5$ .................................................. G06F 1/32
[52] U.S. Cl. ........................ 395/750; 395/575; 364/273.1; 364/DIG. 1; 364/948.8; 364/DIG. 2
[58] Field of Search ............... 395/750, 575; 364/707, 364/273.1, DIG. 1, 948.8, DIG. 2; 371/66, 14, 12; 307/66; 365/226, 227, 228, 229

[56] References Cited

U.S. PATENT DOCUMENTS

| | | | |
|---|---|---|---|
| 4,307,455 | 12/1981 | Juhasz et al. | 364/DIG. 2 |
| 4,327,298 | 4/1982 | Burgin | 395/750 |
| 4,384,214 | 5/1983 | Crick et al. | 307/66 |
| 4,409,665 | 10/1983 | Tubbs | 395/750 |
| 4,458,307 | 7/1984 | McAnlis et al. | 364/DIG. 1 |
| 4,516,035 | 5/1985 | Rhoads et al. | 307/66 |
| 4,528,458 | 7/1985 | Nelson et al. | 307/64 |
| 4,528,459 | 7/1985 | Wiegel | 307/66 |
| 4,611,289 | 9/1986 | Coppola | 364/492 |
| 4,672,228 | 6/1987 | Swoboda | 307/66 |
| 4,675,538 | 6/1987 | Epstein | 307/66 |
| 4,868,832 | 9/1989 | Marrington et al. | 371/66 |
| 4,907,183 | 3/1990 | Tanaka | 364/707 |
| 4,959,774 | 9/1990 | Davis | 395/575 |
| 4,965,828 | 10/1980 | Ergott, Jr. et al. | 371/14 |
| 5,012,406 | 4/1991 | Martin | 364/DIG. 1 |
| 5,057,697 | 10/1991 | Hammond et al. | 307/66 |

*Primary Examiner*—Michael R. Fleming
*Assistant Examiner*—Glenn A. Auve
*Attorney, Agent, or Firm*—Konneker, Bush & Hitt

[57] ABSTRACT

A power supply for a computer system manager, wherein the power supply has its own secondary power source operable when input power to the system manager no longer meets preset threshold values. The power supply functions in one of a discrete number of power modes depending upon the amount of energy available from either the computer input power or the secondary power source. The power supply switches to one of the group of power modes to conserve secondary power when the computer input power is no longer available. The power modes are controlled by a power mode controller which selectively directs power to discrete components of the system manager as a power conservation technique. The power mode controller always energizes the random access memory of the system manager in order to maintain data integrity. Upon detecting insufficient energy within the secondary power source, the power mode controller terminates all power flow from the power supply, including power flow to the random access memory, at which point the entire system has lost all data and configuration settings.

17 Claims, 7 Drawing Sheets

POWER SUPPLY FOR COMPUTER SYSTEM MANAGER

CROSS REFERENCE TO RELATED APPLICATIONS

This application is related to co-pending U.S. patent application Ser. Nos. 07/720,259 entitled COMPUTER SYSTEM MANAGER, 07/719,240 entitled INNATE BUS MONITOR FOR COMPUTER SYSTEM MANAGER, 07/720,258 entitled IN BAND/OUT OF BAND ALERT DELIVERY SYSTEM FOR COMPUTER SYSTEM MANAGER, and 07/719,243 entitled REMOTE CONSOLE EMULATOR FOR COMPUTER SYSTEM MANAGER all of which were filed on even date herewith, assigned to the assignee of the present invention and hereby incorporated by reference as if reproduced in their entirety.

BACKGROUND OF THE INVENTION

1. Field of the Invention

The invention relates to a power supply for a computer system, and more particularly to a power supply controller which monitors operating power of the computer system and upon detection of out-of-threshold supply power switches the system to battery power, which in turn has the ability to shut off certain non-essential components of the system in order to conserve battery power and system memory.

2. Description of Related Art

The power supply to a computer or computer system carries the responsibility of providing power usable to the computer. Because most computers require voltage and current different from that generated and transmitted by the local utility company, the computer power supply must convert the in-coming voltage and current to a voltage and current employable by the computer itself. For instance, most utilities in the United States produce power at 120 volts, in a 60 hertz, sinusoidal alternating current. The computer, however, requires in many cases, direct current at a significantly reduced voltage level. Thus, the power supply transforms the "utility power" into "computer power."

While power supplies for computers have existed for as long as computers requiring the power have existed, most power supplies heretofore known merely effectuate the proper power conversions without considerable interaction with the computer. As a result, little if any monitoring of the incoming power occurred. If, the local utility experienced a "brown-out" as is common during the summer months in hot climates, the power supply merely would attempt to transmit the low quality power to the computer. Often times, this poor power did not meet the manufacturer's power specifications and either would cause the computer to discontinue operation, lose data or potentially damage delicate components of the system.

Once the power level causes termination of computer operations all data and configurations stored within the computer evaporate. Most computer systems and power supply components thereof do not include a secondary power source for the computer when primary power either lacks the required quality or completely fails. Further, many of the power supplies commonly employed within computers and computer systems which do have some sort of battery back-up, fail to include life-extending control measures which increase the back-up power period. By prioritizing components which receive the alternate power flow, the secondary power source can function for considerably longer periods than if the entire system received power. Moreover, once secondary power is established the ideal system would continue to monitor the primary power source to determine if operating criteria returns; upon restoration of the primary power the ideal system would then reinstate the normal operating mode.

The need for such a power controller also exists within a system manager. A system manager typically interfaces with a network manager or network operating system to output operational data pertaining to the system and network management. The system manager, as a data collection device, requires continual monitoring of the power supply in order to maintain the data compiled during its cycle of operation. Further, the power supplies currently available do not meet the demands of such a system manager, which demands include analysis aspects of performance management and predictive failure aspects of fault analysis. Each of these analysis require observation of the input and supply power and safety measures designed to protect the volatile data stored by the system manager.

Thus, a power supply which monitors and controls the flow of supply power to a computer or computer system is needed. Further desired within such a power controller is secondary power source, or battery back-up, that saves the volatile data within the computer's memory until the main power returns to an acceptable level. In addition, it is desired that the secondary or battery back-up power last as long as possible, which life-extending measures would require selective operations of critical computer components.

SUMMARY OF THE INVENTION

In a first embodiment, the present invention is an apparatus for delivering, monitoring and conserving power to an energy demanding device that has a variety of individualized components. The apparatus comprises at least one input power source and a means for monitoring energy conducted by the input power source as well as a means for delivering the energy to the energy demanding device. A secondary power source, with its own energy monitoring means and energy delivery means further comprises the apparatus. A means is included for switching from the input power delivery means to the secondary power delivery means, and for switching from the secondary power delivery means back to the input power delivery means. These switching are directed by the input monitoring means. The apparatus contains a means for conserving energy conducted by the secondary power source to the energy demanding device. The energy conserving means permits the apparatus to operate in one of a discrete number of power intensive modes. Finally, the apparatus includes a means for terminating all energy flow when the secondary monitoring means determines that energy conducted by the secondary power source fails to meet preset threshold values.

In another embodiment, the present invention is of a method for providing energy to an energy demanding device that has a variety of individualized components when input power to the device fails. The method comprises the steps of monitoring the input power to the energy demanding device. The step of delivering the input power to the energy demanding device when the input power meets preset threshold values is included within the method of the present embodiment. Further, the method contains the next step of switching from the input power to a secondary power source when the input power fails to meet preset threshold values and the step of monitoring the secondary power source. The method also includes the step of conserving the secondary power source when the input power fails by selectively energizing the individualized components of the energy demanding device. Finally, the method includes the step of terminating energy flow from the secondary power source when the secondary energy flow fails to meet preset threshold values.

In yet another embodiment, the invention is a computer network system having at least one computer system operable therein. The computer system has a plurality of components interconnected by a system bus that transfers information between the components and also includes an input power means for supplying energy to the system. The computer network system comprises a system manager that contains a variety of individualized components. The system manager monitors information transfers along the system bus and processes the information transfers to determine the operating conditions within the computer network system. A power supply operable in one of a discrete number of power modes is operably connected to the system manager. Also included within the system is a means for selectively directing the power supply to operate in one of a discrete number of power modes based upon conditions within the computer network system.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF A PREFERRED EMBODIMENT

Figure 1:
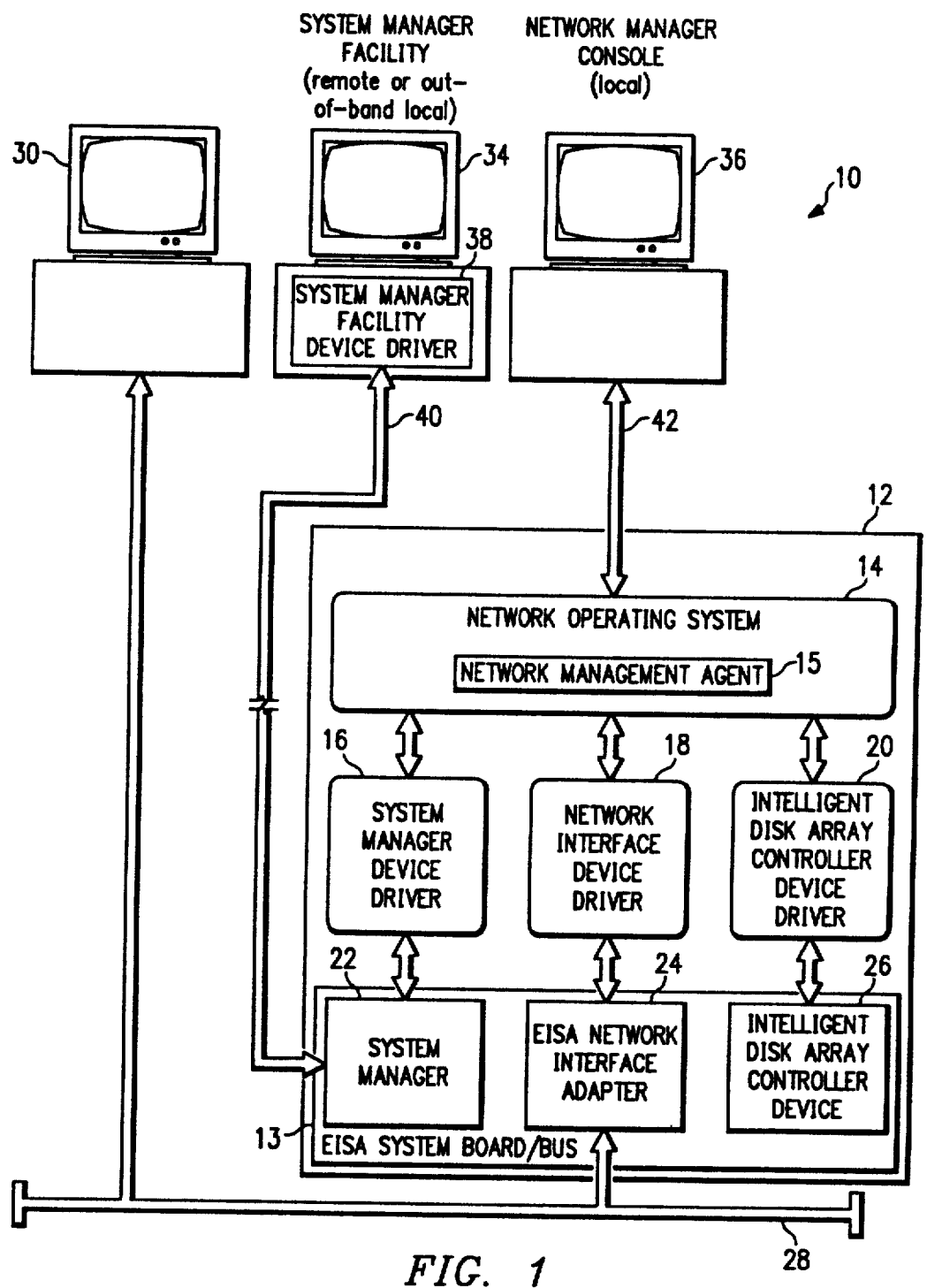
FIG. 1 is a block diagram of a computer network having an EISA based computer system and a computer system manager with a power supply constructed in accordance with the teachings of the present invention installed therein.

Referring first to FIG. 1, an extended industry standard architecture (or "EISA") based computer network 10 having a system manager 22, which system manager receives its supply and control power from a power supply constructed in accordance with the present invention, shall first be described in detail. The computer network 10, which may be configured as either a LAN, WAN, or other type of network configuration, includes an EISA server 12, for example, a Systempro Model 486-840 manufactured by Compaq Computer Corp. of Houston, Tex., having an EISA based computer system board comprised of a series of computer subsystems (not shown) interconnected by a EISA based system bus. As the computer subsystems themselves are not specifically illustrated herein, the EISA computer system board and EISA system bus are, for ease of illustration, indicated as a unified element, EISA system board-/bus 13, although all specific references to such element shall specifically indicate which portion of the unified element is being considered in such reference.

Installed on the EISA computer system board 13 are a plurality of cards which include the system manager 22, which, as will be more fully described below, is comprised of a 32 bit intelligent bus master board and supporting firmware, an EISA network interface adapter 24 and an intelligent disk array controller device 26. Installed in the operating system (or "OS") section of the EISA server 12 is a network operating system 14, preferably one which includes a network management agent 15. It is contemplated that any one of numerous network operating systems, for example, the NetWare or LAN Manager network operating systems previously described, would be suitable for use as the network operating system 14.

Interfacing the system manager 22 and the network operating system 14 is a system manager device driver 16. The system manager device driver 16 acts as a bi-directional translator for all requests to and from the system manager 22, thereby providing two-way communication between the system manager 22 and the network management agent 15. Through this interconnection between the system manager 22 and the network management agent 15, the network management agent 15 may supply information to or receive information collected by the system manager 22. Object management by the system manager 22 may, therefore, be initiated by the network management agent 15 if the network management agent 15 issues instructions to create, delete, modify, reset, or clear objects stored in the system manager 22.

The system manager device driver 16 will also handle certain in-band and out-of band alerts. If generated by the system manager 22, an in-band alert will be transmitted by the system manager device driver 16 to the network operating system 14 which, under the control of the network management agent 15, will direct the in-band alert to a local network manager console 36 connected to the network operating system 14 by in-band network bus 42. Out-of-band alerts generated by the network operating system 14, on the other hand, will be transmitted by the system manager device driver 16 to the system manager 22 for transmission to a remotely located system manager facility 34 connected to the system manager 22 via an asynchronous link 40, for example, a telephone connection. Two-way communication between the system manager 22 and the remotely located system manager console is provided by a system manager facility device driver 38. While there are additional signals transmitted between the system manager 22 and the network operating system 14 by the system manager device driver 16, these additional signals shall be discussed in greater detail later.

The network management agent 15 also operates as a central collection point for network management information for the EISA server 12 by acting as a link between the system manager 22, other cards installed on the computer system board 13, and the computer network itself. For example, in the embodiment of the invention illustrated in FIG. 1, an EISA network interface adapter 24, for example, a Model NE3200 32-bit Ethernet adapter manufactured by Anthem Electronics, Inc., and an intelligent disk array controller device 26, are also installed on the computer system board 13. The network operating system 14 connects the computer system board 13 and, via a network interface device 10 driver 18 which operates in a manner similar to the system manager device driver 16, the network interface adapter 24 for two-way data transmission therebetween. Furthermore, as the network interface adapter 24 is connected for two-way data transmission with the network 28, a two-way communication link between the system manager 22 and the network 28 is thusly provided. The network 28 is the interface of the network components via the network media. The network 28 may be configured in a token ring, ethernet, or other network topology in use today, to control the access of multiple computer stations to the network 28, although, in the embodiment of the invention described and illustrated herein, a single computer station 30 has been provided.

An intelligent disk array controller device driver 20 which, like the network interface device driver 18, operates in a manner similar to the system manager device driver 16, provides for two-way data transmission between the system manager 22 and, via the network operating system, the intelligent disk array controller device 26. The intelligent disk array controller device 26 provides disk storage for the computer system board 13. For example, it is contemplated that the intelligent disk array (or "IDA") controller device 26 may provide 840 Mbytes of disk storage for the computer system board 13 by associating four 210 M-byte Compaq IDA drive pairs therewith.

Figure 2:
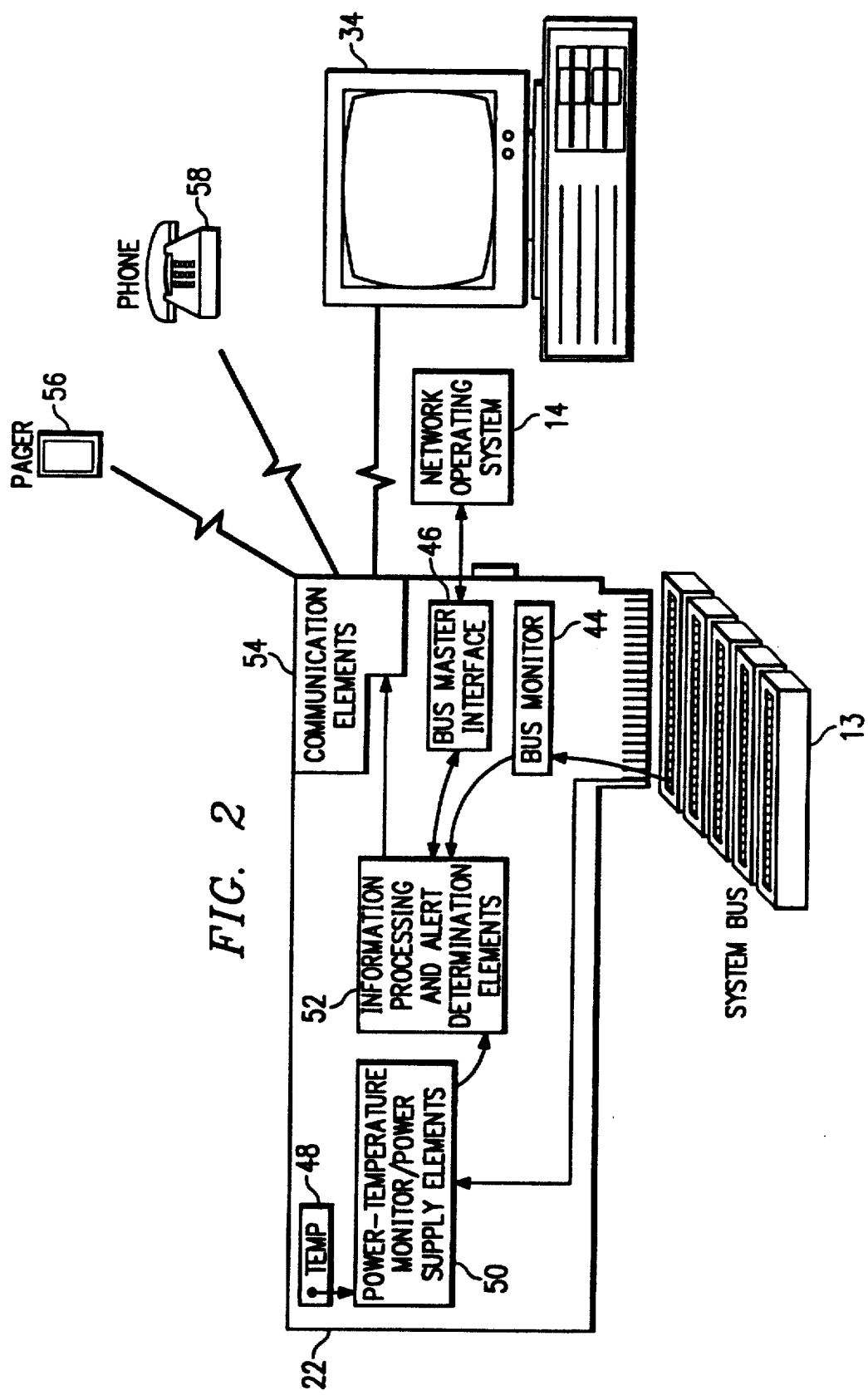
FIG. 2 is a block diagram of the system manager of FIG. 1 which illustrates information flow to and from, as well as within, the system manager.

Referring next to FIG. 2, the flow of information, most commonly in the form of data and alerts, to and from, as well as within the system manager 22 shall now be described in greater detail. As will be more fully described below, the system manager 22 has the ability to monitor various system components and parameters. If a component experiences a failure or exhibits characteristics that indicate it may experience a failure, the system manager 22 detects the failure or characteristic indicative of a potential failure and reports the failure or characteristic indicative of a potential failure as an alert in a manner such that corrective action can be taken.

As may be seen in FIG. 2, the path by which data accumulated during the monitoring of system components and parameters indicative of an actual or potential failure may be any one of four paths, depending on the particular type of actual or potential failure being monitored. Each system component being monitored may be referred to as an object having a number of attributes. As the components continue to be monitored, the value of the object's attributes may change, for example, by incrementing, decrementing, updating, resetting or modifying. When the attributes exceed their boundary or threshold value, an alert will be generated. In addition to alerts, the attributes of objects may be utilized to provide continuous real-time monitoring of the computer system board 13 without interfering with normal system operations.

Addressing the specific signals being monitored by the system bus manager 22, the computer system bus 13 supplies certain signals to a bus monitor 44 which will help determine the state of the computer system board 13. These signals include interrupt request (or "IRQ") signals, data memory request (or "DRQ") signals and input/output (or "I/O") signals. In one embodiment of the invention, it is contemplated that the bus monitor 44 monitors the I/O signals although, in a further embodiment of the invention, it is contemplated that the bus monitor 44 monitors the supplied IRQ, DRQ and I/O signals. If the signals are active, then the corresponding system resources are being used. In this manner, these signals may be used to monitor the performance of the computer system board 13. Other signals supplied by the computer system bus 13, are utilized during object management to indicate alert conditions. For example, the absence of the refresh signal will generate an alert since the lack of refresh may cause the file server 12 to fail. Similarly, an indication of a memory parity error will cause the generation of an alert. Also innately monitored by the bus monitor 44 are the printer port, so that the system manager 22 can report whether or not there is a printer error or is out of paper, the asynchronous serial port, so that the system manager can monitor and log asynchronous activity such as overrun errors, parity errors, and framing errors for system board serial ports, system software, so that software errors can be identified, and keyboard events, so that keystrokes can be logged and the relationship between a system failure and keyboard inputs can be analyzed. Finally, the bus monitor 44 will detect the assertion of IOCHK, indicative of a catastrophic board failure, and board "times out", indicative of a violation of EISA standards. The bus monitor 44 transfers these signals to information processing and alert determination elements 52 where the monitored information is processed. As will be more fully described below, the information processing and alert determination elements 52 of the system manager 22 is comprised of a control processor and supporting logic which, by the application of object management techniques, is configured to determine whether the monitored information warrants the generation of an alert.

The system manager 22 further provides for the monitoring of other signals for delivery to the information processing and alert determination elements 52 for potential generation of alerts. These other signals are supplied to the information processing and alert determination elements 52 by a path distinct from that previously discussed. To power the system manager 22, the computer system bus 13 provides ±5 Volt and ±12 Volt lines, to a power-temperature monitor/power supply elements 50. The level of voltage supplied to the system manager 22 is converted into a digital signal by an analog-to-digital converter included in the power-temperature monitor/power supply elements 50 and the digital power level signal is provided to the information processing and alert determination elements 52. For example, if a drop in system power is detected, the information processing and alert determination elements 52 will generate an alert. If, however, a complete loss of power occurs, the system manager 22 will switch to battery power and the event reported, again as an alert, through one or both of its asynchronous modem and serial connections. The interconnection between the system manager 22 and the power supply elements 50 are more fully described in FIGS. 6-7 attached hereto. Briefly, however, after loss of system power, the system manager will switch into reserve power to deliver alerts and, after completing alert delivery, to standby mode to conserve power. After reserve power is exhausted, the system manager then switches into dormant mode to keep its RAM memory valid for an extended period of time and, after the expiration of the extended period of time, cutting power off completely.

The system manager 22 is further provided with a temperature sensor 48. The internal temperature of the system manager 22 is continuously monitored by the temperature sensor 48 and the measured temperature transmitted to power-temperature monitor/power supply elements 50 where analog to digital conversion of the monitored temperature is performed. The digital temperature level is then transmitted to information processing and alert determination elements 52 for object management. If the information processing and alert determination elements 52 determine that the temperature has risen above a predetermined threshold, then an alert may be issued.

Finally, a bus master interface 46 is used to transfer certain signals from the network operating system 14 to the information processing and alert determination elements 52. Typically, the information provided by the bus master interface 46 differs from that passively supplied by the bus monitor 44 or the power-temperature monitor/power supply elements 50 in that information supplied via the bus master interface 46 are supplied as hard inputs. However, by interfacing with network operating system 14, the system manager 22 can monitor network resources other than the computer system board 13 itself. For example, in a typical network management system, the intelligent disk array controller device 26 would provide management information to the network management agent 15 such as the number of read errors that have occurred. In turn, the network management agent 15 can provide that information to the system manager 22 via the bus master interface 46.

The information passively monitored by the bus monitor 44 and the power-temperature monitor portion of the power-temperature monitor/power supply elements 50 and supplied to the information processing and alert determination elements 52, as well as that information supplied to the information processing and alert determination elements 52 by the bus master interface 46 may be used for several purposes. First, the information processing and alert determination elements 52 can process the information and, if appropriate, generate an alert. Examples of alert conditions that may be determined by information processing and alert determination elements 52 include loss of system power, server subsystem failure, excessive server temperature as well as other configurable events that require outside attention.

Once the information processing and alert determination elements 52 determine that an alert should be issued, such an alert can be issued in a number of ways. Initially, it must be determined if the alert should be delivered "in-band" or "out-of-band". Once originated by the information processing and alert determination elements 52, an in-band alert is directed to the bus master interface 46 and on to the network operating system 14 and, under the control of the network management software contained in the network management agent 15, on to the local network manager console 36. So that the use of existing network hardware is maximized, it is contemplated that in-band alerts to the local network manager console 36 will be utilized as the primary path for communications with the system manager 22. It should be specifically noted, however, that, a local system manager console may be used to receive in-band alerts without departing from the practice of the present invention. If the information processing and alert determination elements 52 determine that the alert should be issued "out-of-band", the alert is transmitted to communication elements 54 where an alert is issued. As is more fully described in co-pending U.S. patent application Ser. No. 07/720,258 entitled "In-band/Out-of-band Alert Delivery System for a Computer System Manager" and previously incorporated by reference, the communication elements may send an out-of-band alert by sending a protocol message over a switched telephone connection to the system manager facility 34, by dialing a phone number associated with a pager 56 or by dialing a phone number to a phone 58 associated with a person and generating a synthesized voice message upon completing a connection with the phone 58.

In addition to alert determination and generation based upon the passively monitored information, the information processing and alert determination elements 52 also perform several other functions. More specifically, the received information is also time stamped and stored or "logged" into RAM memory for later access. Thus, in the event of a catastrophic failure of the file server 12, the monitored and logged information will be available for "post mortem" diagnostics. Similarly, network information may be transferred over the bus master interface 46 and logged into RAM memory contained within the information processing and alert determination elements 52. Finally, the objects can be transferred, for example to the remote system manager facility 34 or the local network manager console 36 to provide real-time information regarding the performance of the system manager 22.

Through the link between the communications elements 54 of the system manager 22 and the system manager facility 34, significant control of the system manager 22 can be performed from a remote location. From the system manager facility 34, remote console emulation, access to stored data and remote control or "rebooting" may be performed. Remote console emulation or "hard key insertion" permits keystrokes at the remote console to be delivered to the system manager 22 as if they were input locally. Through the hard key insertion, "soft" reboots are emulated by simultaneously inserting "control"—"alt"—"del" to actuate a reboot of the system manager 22. While not being able to actuate a complete "hard" reboot, the system manager facility 34 can simulate a hard reboot by selectively removing power from system components. More information regarding remote console emulation is set forth in co-pending U.S. patent application Ser. No. 07/719,243 entitled "Remote Console Emulator for a Computer System Manager" and previously incorporated by reference.

Figure 3:
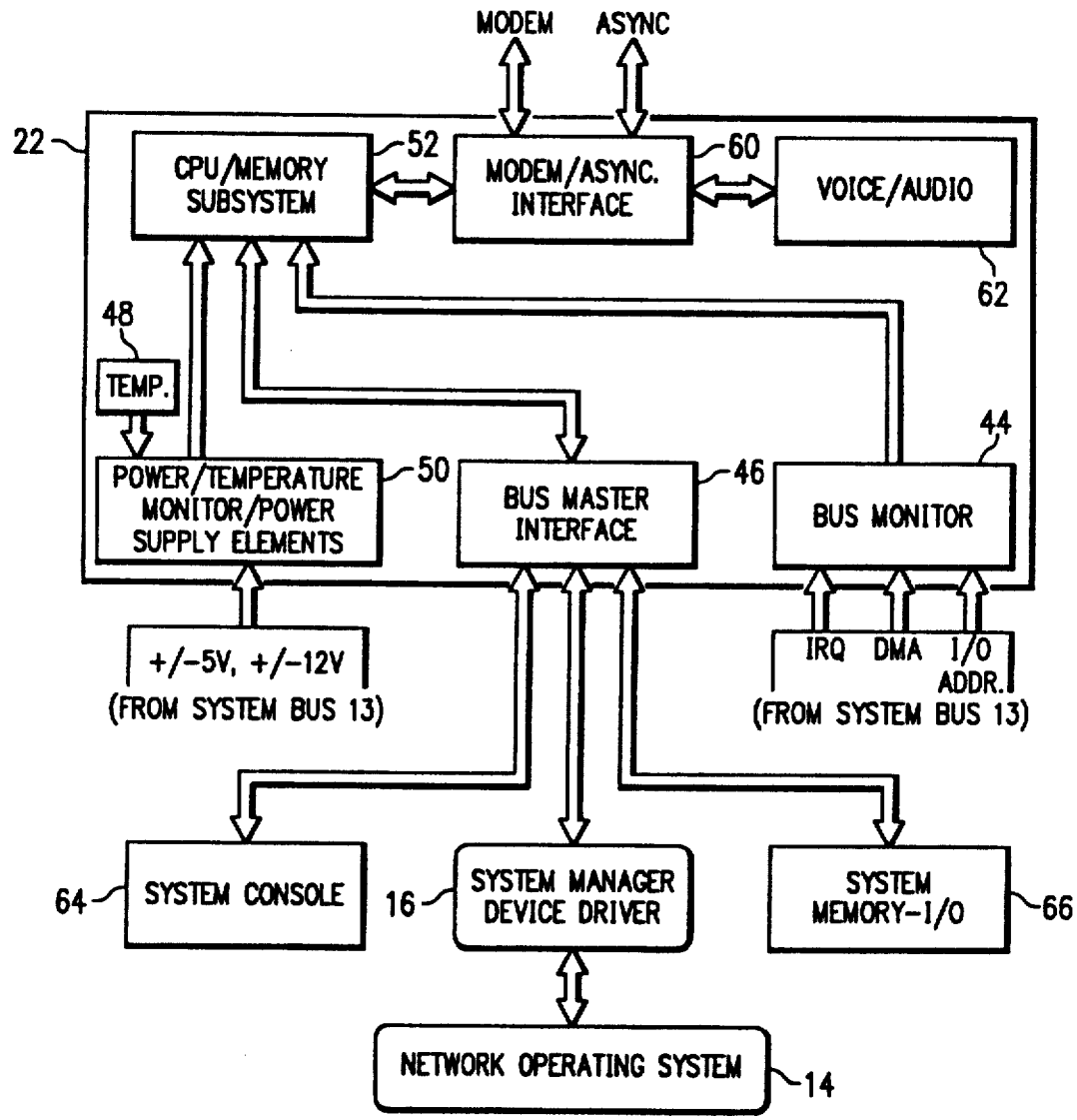
FIG. 3 is a top level block diagram of the system manager of FIGS. 1-2

Referring next to FIG. 3, the structural configuration of the system manager 22 shall now be described in greater detail. While quite similar to FIG. 2, certain elements of the system manager 22 have now been redesignated to more closely describe their structural configurations whereas, in FIG. 2, such elements were designated with their operational characteristics closer in mind. As may be better seen in FIG. 3, the bus monitor 44 innately monitors a plurality of signals relating to the state of the computer system board 13. Innate monitoring is accomplished by the bus monitor 44 receiving all data and address signals being transferred along the system bus 13. The bus monitor 44 will then select those signals which will help determine the state of the computer system board 13 and directs the selected signals via a bus to, what previously was functionally designated as the information processing and alert determination elements 52 and what is now structurally designated as a CPU/memory subsystem 52 which is the hardware which, together with associated firmware, will perform the aforementioned information processing and alert determination functions. Other signals, indicated here as miscellaneous system signals, are always considered to help determine the state of the computer system board and are directed through the bus monitor 44 to the CPU/memory subsystem 52. Additionally, the system bus 13 supplies power to the system manager 22 via ±5 V, ±12 V lines to the power-temperature monitor/power supply element 50 and on to the CPU/memory subsystem 52. In the event of that the supply of power from the system bus 13 is terminated, the power-temperature monitor/power supply element 50 will begin supplying power from a battery included therein. The termination of the supply of power from the system bus will also be reported to the CPU/memory subsystem 52 as an alert condition.

Connected to output of the CPU/memory subsystem is a modem/asynchronous interface 60 represents the two paths along which an out-of-band alert may be transmitted, via an asynchronous communication port or via a modem, in the event that an alert condition has been established. Alert conditions include loss of system power, server subsystem failure, excessive server temperature as well as out of other events which require the attention of the system manager facility 34. Either of these may be used to report an alert condition, although the modem would typically contact either one of the pager 56 or the phone 58 while the asynchronous communication port would typically contact a remote system manager, for example the system manager facility 34 illustrated in FIG. 2. Servicing the modem/asynchronous interface 60 is voice/audio elements 62. In the event that a voice alert is selected, the voice audio elements generate the voice alert which is then transferred to a phone 58 via the modem. Finally, in the system manager configuration illustrated herein, a local system manager console 64 and system memory I/O support the system manager 22 and are accessible via the bus master interface 46.

Figure 4:
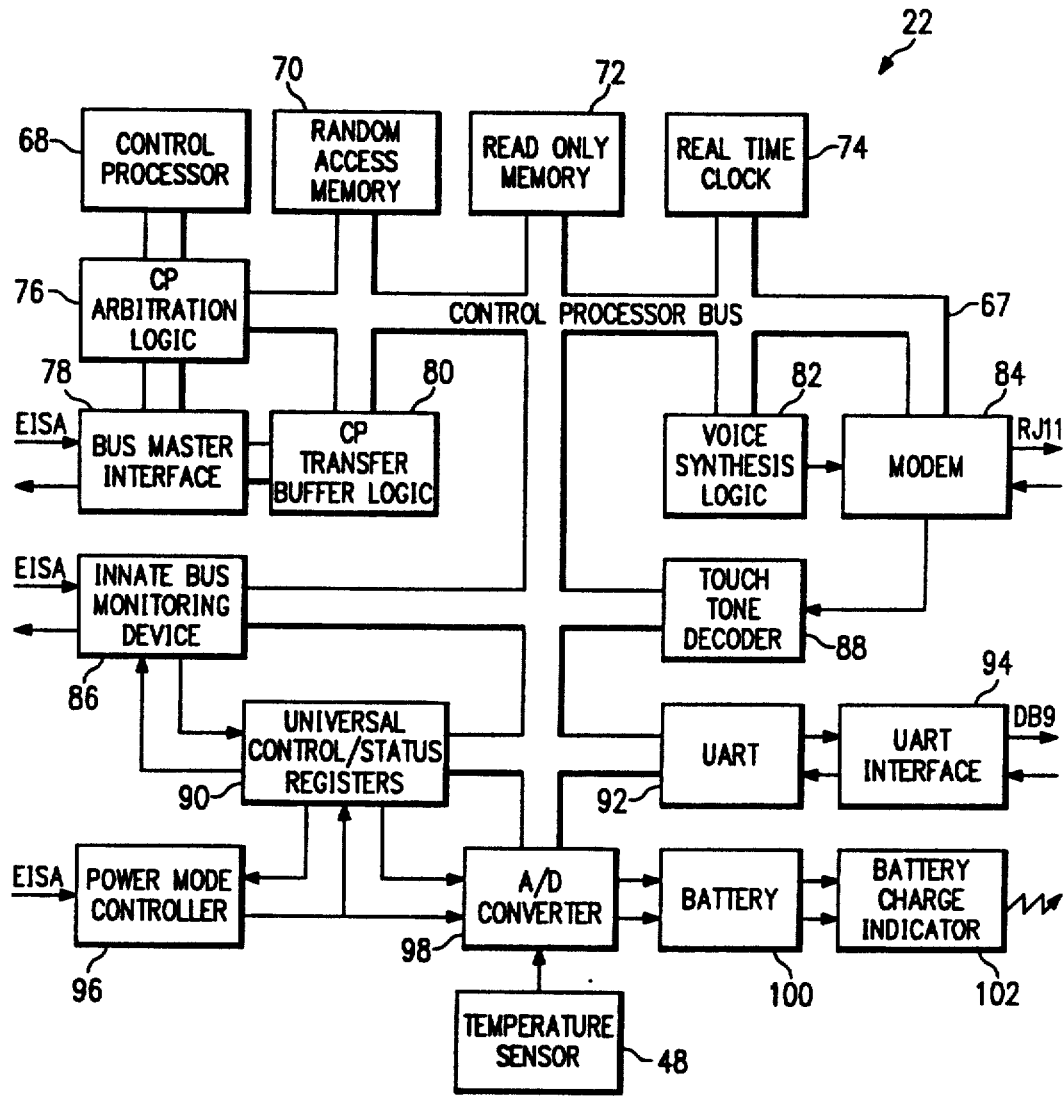
FIG. 4 is a low level block diagram of the system manager of FIG. 3.

Referring next to FIG. 4 the system manager 22 shall now be described in still greater detail. The system manager 22 is comprised of a bi-directional control processor bus 67 and a series of system manager components connected to the control processor bus 67 for the transfer of address, data and control signals between various components of the system manager 22. Connected to the control processor bus 67 are a control processor 68, random access memory 70, read only memory 72, a real time clock 74, control processor arbitration logic 76, a bus master interface 78, control processor transfer buffer logic 80, voice synthesis logic 82, a modem 84, a innate bus monitoring device 86, a touch tone decoder 88, universal control/status registers 90, a universal asynchronous receiver transmitter (or "UART") 92, a UART interface 94, a power mode controller 96, an analog-to-digital converter 98; and indirectly a battery 100 and a battery charge indicator 102 and a temperature sensor 48.

The various operations performed by the system manager 22 and the various system manager compo-
nents 48 and 68–102 which are utilized to perform such operations shall now be described in greater detail. In the embodiment of the invention disclosed herein, the control processor 68 is a 16 bit microprocessor which operates at 16 MHz, although, in alternate embodiments of the invention, other microprocessor types will be suitable for use. The control processor 68 performs multiple tasks, including a primary task of collecting and storing information received from multiple sources and detecting failures based upon acquired data and issue alerts as appropriate. The control processor 68 also performs several other tasks which will be described in greater detail later. In its primary task, object data which is processed by the control processor 68 is stored in the random access memory 70 and processor instructions are stored in the read only memory 72. Depending on the particular object management performed on a particular system component, data from the computer system bus 13 and innately monitored by the innate bus monitoring device 86 may be operated on by the control processor 68 and the resultant object stored in the random access memory 70 or, depending on the particular object being managed, may be directly stored into the random access memory 70. Similarly, temperature and/or power data transmitted by the A/D converter 98 may be operated on by the control processor 68 and the result stored in the random access memory 70 or may be directly stored into the random access memory 70. The real time clock is a clock independent of the system clock which is configured to store date, time, year and other time related variables relating to objects, depending on user preference.

In "normal" operation, the control processor 68 controls the control processor bus 67 to provide data transfers between the control processor 68, the random access memory 70, the read only memory 72 and the real time clock 74. In normal operation, the control processor 68 performs object management as set forth in detail elsewhere. Based upon the acquired data, object management will provide for the detection of failures of the file server 12 or subsystems thereof.

The bus master interface 78 which, for example, may be an Intel 82355 BMIC, is configured to interrogate and modify the memory and I/O space 66 of the computer system 13 as well as the random access memory 70 of the system manager 22. For example, during a "data transfer operation" involving the system manager 22, the control processor arbitration logic 76 instructs the control processor bus 67 regarding the address, direction and destination of the data transfer. The control processor arbitration logic 76 then instructs the bus master interface 78 as to the transfer. Once the system manager 22 is ready for a transfer, the bus master interface 78 will then instruct the computer system bus 13 to arrange for a burst transfer of data to the bus master interface 78 which, in turn, will transfer the data, to the control processor transfer buffer logic 80 and on to the random access memory 70 for storage. Transfer of data from the random access memory 70 to the bus master interface 78 is accomplished in reverse manner.

Once, object management within the control processor 68 has indicated that an alert should be generated, the control processor 68 controls the delivery of the appropriate alert message via the modem 84, the UART 94 and/or the network operating system 15. The UART 94 provides an asynchronous interface between the system manager 22 and the system manager facility 34. Through a software interface provided between the UART 94 and the system manager facility 34, for example, by use of the Windows software, the system manager facility 34 is capable of reading monitored object values from and writing object control to the system manager 22. Likewise, video screen data can be transmitted from the system manager 22 to the remote console and keystrokes can be transmitted from the system manager facility 34 to the system manager 22. The system manager facility 34 also keeps alert logs. Finally, another function of the UART 94 is to connect an external modem to deliver page alerts under the control of the control processor 68.

As previously mentioned, alerts delivered to the pager 54 or the phone 56 are made via the modem 84 under the control of the control processor 68. When, however, an alert message is delivered to the phone 56, the voice synthesis logic 82 is utilized by the control processor 68 in order to generate an audible, voice alert. Pre-recorded voice messages are stored within the voice synthesis logic 82. These voice messages, which are stored in accordance with adaptive differential pulse code modulation, relate to a multitude of messages which may be accessed by the control processor and transmitted. For example, dates, numbers, alert conditions, names, voltages which correspond to the information useful to identify the type, severity, time of, location, or other identifying information regarding alert conditions. Thus, if the control processor desired to transmit a voice alert, the control processor 68 would instruct the voice synthesis logic 82 to supply the selected message to the modem 84, which, for example may be a 2400 bit per second modem, can transmit the selected message over its two way interface with the phone 58. After the alert has been transmitted, the modem 84 will await a return call through which it will pass server information and control.

The touch tone decoder 88 is connected to accept analog signals from the modem 84. The touch tone decoder 88 decodes signals received by the modem and informs the control processor as to the nature of the signal. Most commonly, the touch tone decoder will be used to provide security for the system manager 22. For example, when a alert delivery is sent via the modem 84 to a pager 56 or a phone, a user receiving the alert will, in many situations, desire to contact the system manager 22 for additional information. For example, if the user transmits a password to the modem 84, the touch tone decoder 88 will decode the tones and transmit the decoded tones to the control processor 68. The control processor 68 then decides whether the password is legitimate. As will be more fully described in co-pending application Ser. No. 07/719,243, entitled "Remote Console Emulator for System Bus Manager", and previously incorporated by reference, the touch tone decoder 88 is also utilized in connection with remote console emulation operations.

The power mode controller 92 both controls the power for the system manager 22 and monitors the power level for the system board. In a manner more fully described FIGS. 6–7, the power mode controller 92 will control the operation of the system manager 22 by designating which of alternate power modes the system bus manager 22, or in accordance with the requirements of certain power modes, which components of the system bus manager 22 are to be supplied power. In the event that power from the system bus 13 is unavailable, the battery 100 shall supply power to either the system manager 22 or to selected components thereof. As the battery 100 is rechargeable, the battery charge indicator 102 is provided to indicate when the battery 100 is being recharged. For example, the power mode controller 92 will cause the system manager 22 to activate the battery 100 should the supply voltage needed to operate the system manager 22 fall below a minimum operating voltage. The power mode controller 92 will also turn on and off devices not needed during operation of the battery 100. This circuitry will provide the best use of the battery 100 in this low power mode. After the processor delivers an alert, the power mode controller 92 will turn off the power to the control processor 68. The processor will be restarted when a call is detected, UART activity, expiration of set interval in real time clock and other system activity or subsystem activity.

Figure 5:
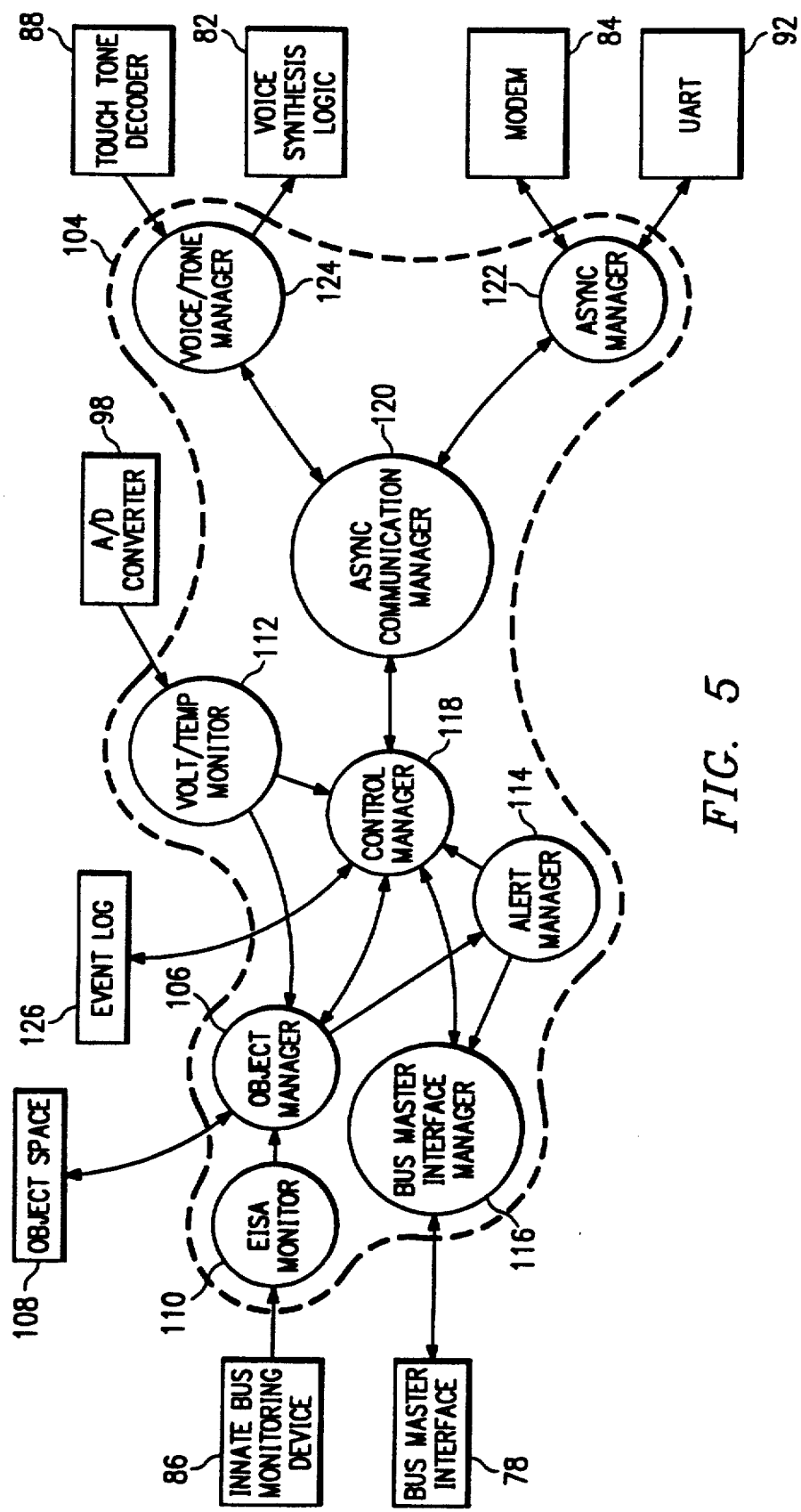
FIG. 5 is a flow diagram of the dataflow between the hardware and software components of the system manager of FIGS. 1-3.

Referring next to FIG. 5, the flow of data between the various hardware and firmware components of the system manager 22 shall now be described in greater detail. System manager occurs within the control processor 68 by the interaction of the control processor firmware 104 with the control processor's random access memory 70 as well as certain other hardware elements. In a manner to be more fully described below, the system manager firmware 104 acts upon inputs from the bus master interface 78 and the UART 94, monitors parameters of the system board 13 being input by the innate bus monitoring device 86, monitors temperature and power parameters of the system board 13 being input by the A/D converter 98, and, as deemed necessary, generate alerts via the bus master interface 78 and/or the UART 94.

The system manager 22 operates based upon the concept of object management. Each object represents a system component that can be managed and contains pertinent information about the component that it represents. As changes occur that affect the status of a component, the information contained in the corresponding object is updated. Objects and/or data related to objects are input to the system manager firmware 104, processed therein, and stored in an object space 108 located within the random access memory 70. The object space 108 is managed by an object manager 106 which receives object messages from the bus master interface 78, the UART 94, and, in the case of innate objects updates, from within the system manager firmware 104 itself.

More specifically, an EISA monitor 110, in conjunction with programmable hardware within the innate bus monitoring device 86, selectively listens to bus activity. As events are detected, the EISA monitor 110 provides information relating to the object manager for updating the innate objects corresponding to the event. Similarly, the voltage/temperature monitor 112 periodically monitors the ±5, ±12 voltages supplied to the system bus manager 22 by the system bus 13 and updates the innate objects corresponding to power and temperature. In the event of a loss of power from the system bus 13, however, the voltage/temperature monitor 112 will report a power event directly to a control manager 118.

For each update, increment or decrement, the object manager 106 will, in the event that a boundary or threshold has been exceeded, determine that an alert needs to be issued. The object manager 106 will then request that an alert manager 114 compose an appropriate alert message and transmit the composed message. If the composed alert message is to be an in-band alert, the alert message is sent to a bus master interface manager 116 and, if the composed alert message is to be an out-of-band alert, the alert message is sent to the control manager 118. The control manager 118 would then forward the out-of-band alert to an asynchronous communication manager 120. The asynchronous communication manager 120 acts a traffic controller between the various tasks to be performed by the system manager firmware 104 and an asynchronous manager 122 which provides the firmware interface between the system firmware 104 and both the modem 84 and the UART 94. For example, if a voice message is to be generated for the out-of-band alert, the asynchronous communication manager 120 would interface with a voice/tone manager 124 which, like the asynchronous manager 122, provides the firmware interface between the system firmware and the voice synthesis logic 82 and the touch tone decoder 88. Thus, during the out-of-band alert delivery, the asynchronous communication manager 120 would transfer the alert message, as well as any voice message to accompany and/or comprise the alert, to the asynchronous manager 122 which would then deliver the alert message, either via the modem 84 or the UART 94.

Finally, in addition to delivering out-of-band alert messages originating with the alert manager 114 to the asynchronous communication manager 120, the control manager 118 performs several other functions. First, in the event of critical event occurrences, such as loss of power or failure to communicate with the system 13, the control manager will directly generate out-of-band alert messages. Second, the control manager serves to monitor significant events monitored by other managers, log events in an event log 126 which, like the object space 108, is located within the random access memory 70, and provide logged information as requested. Logged information can be requested by the bus master interface manager for transfer, via the bus master interface to the network operating system 14 and by the asynchronous communication manager 120 for transfer via the asynchronous manager 122 to the UART 94.

Figure 6:
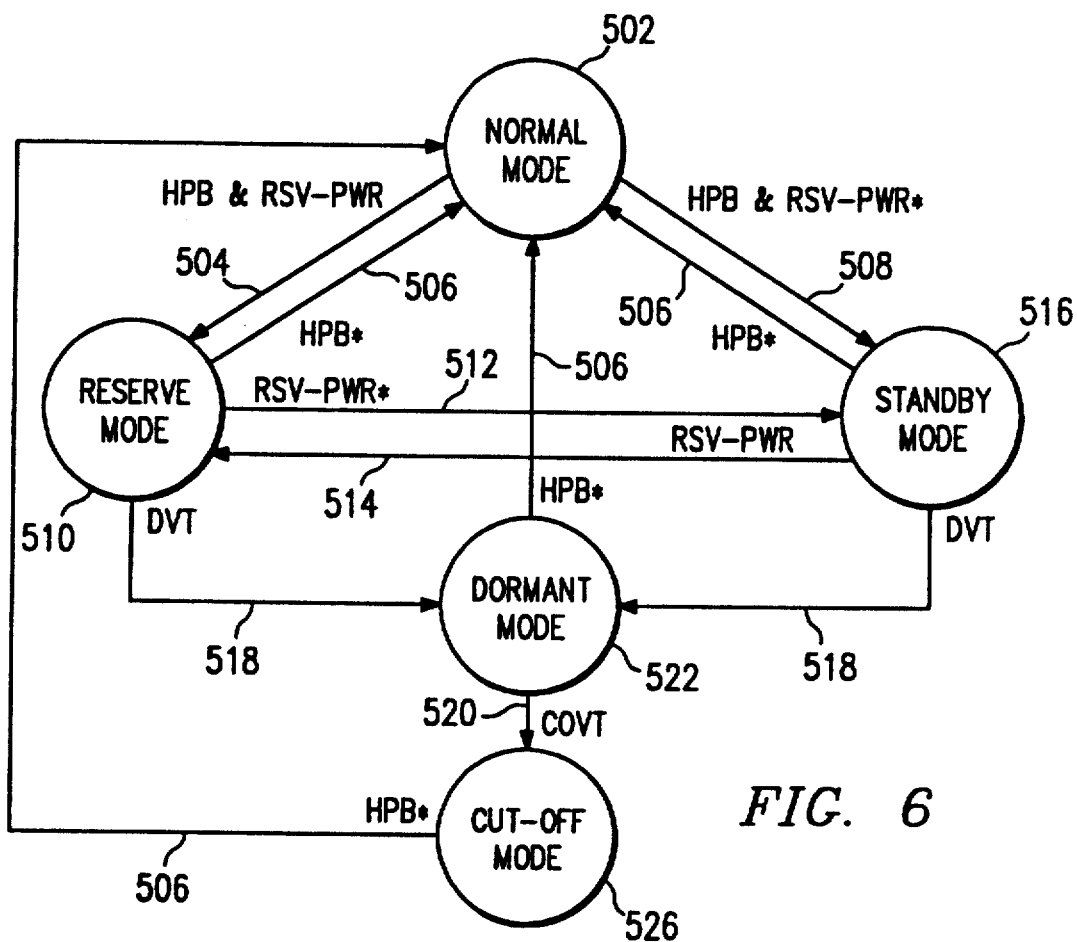
FIG. 6 is a state diagram showing the power modes available to the power supply controller constructed in accordance with the teachings of the present invention.

Referring now to FIG. 6, there is shown an operational diagram illustrating the various states available through the power control of the preferred embodiment of the present invention. Located within the system manager 22 is the power mode controller 92. The power mode controller 92 manipulates the system manager 22 power status. The system manager 22 operates within one of the five modes shown within FIG. 6. The power mode controller 92 switches the system manager 22 between these five power mode states depending upon the quality of primary power. First, the normal mode bubble 502 indicates operation of the system manager 22 when the host DC power is within preset threshold ranges. During operation in the normal mode, power is received through the hardware comprising the system manager 22. This hardware, however, includes the power mode controller 92 which monitors the power received through the system manager 22. Since the primary purpose of the system manager 22 is to gather information regarding the operation of the system, the power mode controller 92 safe-guards the gathered data by switching from normal mode 502 when the power received through the system falls outside of a specified range.

Once the reliability of the power source from the system deteriorates, the power mode controller 92 switches from the normal mode 502 to the reserve mode bubble 510. In reserve power mode, the battery 100 operates the system manager 22. Since the battery 100 powers the system manager 22 in the reserve mode 510, an assurance check on the battery status first occurs. FIG. 6 illustrates the further criteria required for the power mode controller 92 to switch from the normal mode bubble 502 to the reserve mode bubble 510. The HPB and RSV-PWR arrow 504 indicates that both Host Power is Bad and ReSerVe-PoWeR has been enabled by the control processor 68. The power mode controller 92 will revert back to the normal bubble 502 from the reserve mode bubble 510 when host power is no longer bad, illustrated by the HPB* arrow 506. Host power is no longer bad when the host power returns to the threshold settings. In reserve power mode many of the functional elements of the system manager 22 remain powered by the battery 100. Specifically, in the preferred embodiment, the control processor 68, the random access memory 70, the read only memory 72, the touch tone decoder 88, the host bus monitor 86, the real time clock 74, the modem 84 and the power mode controller 92 continue to receive power through the battery 100. Further, reserve power mode still permits the system manager 22 to deliver and receive information. Thus, while in reserve power mode the system manager 22 alerts the user of any alert states that arise.

Referring briefly back to FIG. 4, the system manager 22 enters the reserve mode 510 through a signal initiated by an external programmable interrupt controller ("EPIC" not shown) which is incorporated into the control processor 68. In the preferred embodiment, for example, the external programmable interrupt controller comprises a 82C59A PIC manufactured by Intel Corporation. The signal transmitted by the EPIC interrupts the control processor 68. The control processor 68 then, through internal software, asserts a reserve enable bit within the universal control/status registers 90. Upon asserting this bit, the control processor 68 clears the EPIC interrupt to stay in reserve power mode. All interrupts to the EPIC are software programmable within the control processor 68. This programmability permits the selection of interrupts that put the system manager 22 into reserve power mode.

Returning to FIG. 6, from the reserve mode bubble 510, the power mode controller 92 will take the system manager 22 to the standby mode bubble 516. Generally, the power mode controller 92 will leave the reserve mode 510 for the standby mode 516 subsequent to alerting the user of any alert condition that arises. The standby mode 516 principly operates in a conservation manner to achieve the longest possible life out of the battery 100. In order to vacate the reserve mode bubble 510 for the standby mode bubble 516, the battery 100 must still contain sufficient power to prevent dormant mode or cut-off mode. In addition, the control processor 68 negates the reserve power bit within the universal control status registers 90, as is seen by the RSV-PWR* arrow 512, and the EPIC negates its interrupt of the control processor 68. The power mode controller 92 can take the system manager 22 directly from the normal mode 502 to the standby mode 516. This occurs when the host power is bad and the reserve power bit has not been set in the universal control status registers 90. FIG. 6 illustrates this through the HPB and RSV-PWR* arrow 508. In turn, the power mode controller 92 can return the system manager 22 to the normal mode 502 from the standby mode 516 when the host power is no longer bad, as shown in the HPB* arrow 506. While in standby power mode, the random access memory 70 and the real time clock 74 are write protected and continue to receive power, thereby ensuring accuracy of the stored information. The power mode controller 92, modem 84 and the UART 92 also receive battery power. The control processor 68, however, is turned off as a power conservation measure.

To return to the reserve mode bubble 510, the RSV-PWR bit must be reinstated in the universal control status registers 90. This is shown by the RSV-PWR arrow 514. This would occur, for example, if the UART 94 asserts a UART interrupt thereby causing the power mode controller 92 to return to the reserve mode bubble 510. In addition, if the modem 84 receives a ring indication, it will assert a MODEM interrupt which will also cause the power mode controller 92 to switch from the standby mode 516 to the reserve mode 510. The real time clock 74, by asserting an RTC interrupt, can also cause the power mode controller 92 to return to the reserve mode 510. The RTC interrupt activates at a programmable interval through the expiration of a watch dog reset timer contained within the real time clock 74. The watch dog reset timer would activate, for example, if the system manager 22 was unable to affirmatively communicate the alert status created by the faulty power. The watch dog reset timer will cause the power mode controller 92 to return to the reserve mode 510, after a preset time, so that it can reassert the alarm until it receives an alarm acknowledge.

Still referring to FIG. 6, the dormant mode bubble 522 is shown emanating either from the reserve mode bubble 510 or the standby mode bubble 516. In the dormant mode 522 the random access memory 70 and the real time clock 74 are powered by the battery, and write protected, with all other functional elements of the system manager 22 powered down. The system manager 22 can remain in the dormant mode 522 for an extended period of time. The primary goal behind the dormant mode 522 is to preserve the information stored so that the user can determine the failure reason. The power mode controller 92 will switch the system manager 22 to the dormant mode 522 when the battery voltage drops below the level sufficient to support either the reserve mode 510 or the standby mode 516. This is shown by the Dormant Voltage Threshold, DVT arrows 518. If the host power returns to acceptable levels, the system manager will return to the normal mode 502 via the HPB* arrow 506.

The fifth and final power state of the present invention is shown by the cut-off mode bubble 526. The cut-off mode 526 disconnects the battery through a mechanical relay to prevent damage to the battery cells comprising the battery 100. The control processor 68 sets the power mode controller 92 to the cut-off mode 526 when host power becomes unavailable for storage or for shipping of the system manager card. Thus, the power mode controller 92 will enter this state if the control processor 68 negates the battery enable signal or if the cut-off voltage threshold signal COVT is reached as illustrated by the COVT arrow 520. Again, if the host power is no longer bad, the system manager will return directly to the normal mode 502 from the cut-off mode 526. HPB* arrow 506 elucidates the return to the normal mode 502. Upon return to the normal mode 502, however, the user will be required to reconfigure the system manager 22 as all power, and thus, memory and programmed configurations are lost when in the cut-off mode 526.

Figure 7:
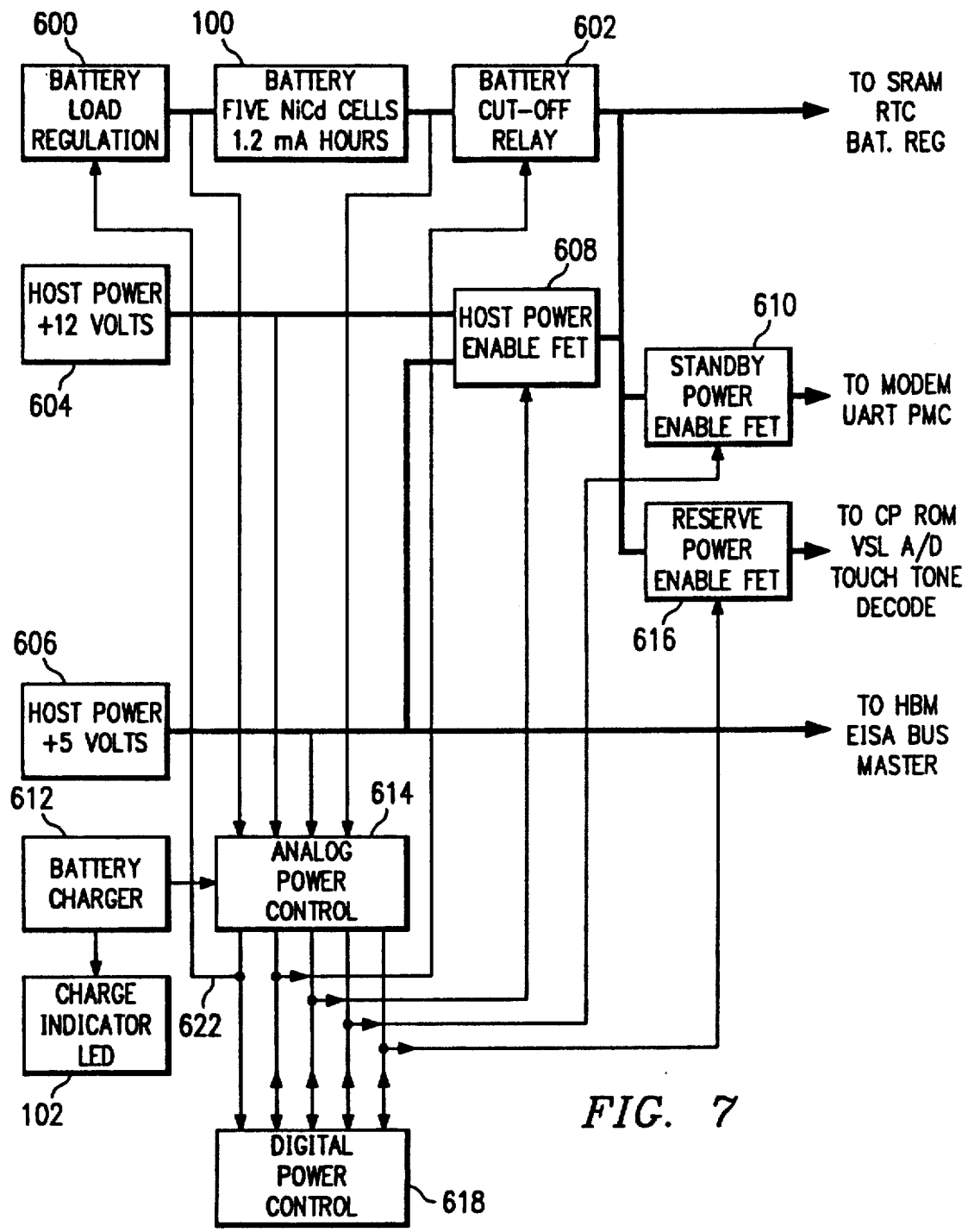
FIG. 7 is a flow diagram of the routes taken by the power supply controller depending upon the specific power mode required by the on-going conditions.

Referring now to FIG. 7, there is shown a flow diagram illustrating the process routing taken by the power mode controller 92. During normal operation of the system manager 22, i.e., the power mode controller 92 has the system in the normal mode 502, the battery 100 receives continual recharging from the battery charger 612 in order to maintain maximum power and life of the battery 100. In the preferred embodiment the battery 100 consists of five rechargeable cells and supporting analog circuitry. The battery charger 612 includes the charge indicator LED 102 which indicates the state of the charge process. For example, in the preferred embodiment, the LED 102 emits amber light during the charge process, and when fully charged the LED 102 emits green light.

The host power +12 volts block 604 and the host power +5 volts block 606 represent the host voltages directed to the system manager 22. The analog power control 614 monitors the voltages flowing from the +12 block 604 and the +5 block 606. The analog power control 614 determines if the voltages emanating from the +12 block 604 and/or the +5 block 606 are within the threshold settings required by the components of the system manager 22. If the voltages are above or below threshold settings the analog power control 614 will initiate a change from the normal mode 502 to the next appropriate power mode.

If the analog power control 614 determines that the +12 block 604 and/or the +5 block 606 fall outside the threshold voltages it will signal the battery load regulation 600 to turn on the battery 100. It can be seen from FIG. 7 that the initiate battery signal 622 leaves the analog power control 614 and is directed to the battery load regulation 600. The battery load regulation 600, in turn, is connected to the battery 100 and, thereby, turns on the battery 100. The battery cut-off relay 602 is always in an "on" state, upon initial power-up. Thus, once the battery 100 is turned on, power instantly flows to the static random access memory 70, the real time clock 74 and the circuitry within the battery load regulation 600. The battery cut-off relay 602 turns off only when all power has drained from the battery 100 and the system manager 22 instructs the power mode controller 92 to go into the cut-off mode 526. In addition to telling the battery load regulation 600 to turn on the battery 100, the analog power control 614 cuts off the voltages from the +12 block 604 and the +5 block 606 when threshold voltages are exceeded. The +12 block 604 and the +5 block 606 normally direct their voltages through the host power enable FET 608; however, once threshold voltages are exceeded the analog power control 614 directs the FET 608 to open the circuit through which the host power flows.

As explained in FIG. 6, once the power mode controller 92 leaves the normal mode 502, either the reserve mode 510 or the standby mode 516 will be entered. The analog power control 614 will determine the power held by the battery 100, and if the power is above the dormant voltage threshold, it will signal the standby power enable FET 610 to switch on. When the FET 610 switches on, battery power will flow to the modem 84, the UART 94 and the power mode controller 92. Further, if the analog power control 614 confirms that the battery 100 contains sufficient energy and the control processor 68 has indicated that it desires to be in reserve power mode, the analog power control 614 will switch on the reserve power enable FET 616. It is seen from FIG. 7, that the control processor 68, the read only memory 72, voice synthesis logic 82, A/D converter 98 and the touch tone decode 88 receive battery power.

When the system manager 22 is in reserve power mode, three switches are on within the system: the reserve power enable FET 616, the standby power enable FET 610 and the battery cut-off relay 602. If the control processor indicates that standby power mode should be entered then the reserve power enable FET 616 is turned off but the standby power enable FET 610 and the battery cut-off relay 602 remain on. Once the analog power control 614 determines that the dormant voltage threshold has been reached, it shuts off the standby power enable FET 608, and only the battery cut-off relay 602 remains on. Finally, if the analog power control determines that the cut-off voltage threshold has been reached the battery cut-off relay 602 will be turned off and no components will remain powered. When turning off the battery cut-off relay 602, there must remain within the power circuitry enough energy to physically switch the relay 602. Thus, the analog power control 614 must ensure that sufficient energy remains to move the relay 602; for example, a capacitor is used to supply energy to switch the relay 602.

The digital power control 618 aids in the reserve power control for switching the relay 602. Furthermore, the digital power control 618 contains a status register, which indicates status of the power mode controller to the control processor. The digital power control 618 assists the system manager 22 in knowing which of the power modes are currently operating. The digital power control contains a control register which allows control of the power mode controller by the control processor.

Thus, there has been described and illustrated herein, a power supply controller. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. An apparatus for delivering, monitoring and conserving power to an energy demanding device having a variety of individualized components, said individualized components including a random access memory, said apparatus comprising:

at least one input power source;
means for monitoring energy conducted by said input power source;
input power delivery means for delivering energy from said input power source to said energy demanding device;
a secondary power source;
means for monitoring energy conducted by said secondary power source;
secondary power delivery means for delivering energy from said secondary power source to said energy demanding device;
means for switching from said input power delivery means to said secondary power delivery means and for switching from said secondary power delivery means to said input power delivery means as directed by said input power source monitoring means;
means for conserving energy conducted by said secondary power source to said energy demanding device by selectively terminating energy flow to said variety of individualized components when said secondary power source powers said energy demanding device; and
means for terminating all energy flow when said secondary power source monitoring means determines that energy conducted by said secondary power source fails to meet preset threshold values;
said means for conserving energy further comprising means for preserving data stored in said random access memory until all energy flow is terminated by selectively terminating energy flow to said variety of individualized components other than said random access memory when said secondary power source powers said energy demanding device while maintaining energy flow to said random access memory;
wherein said means for switching from said input power delivery means to said secondary power delivery means comprises a switch and a battery load regulator, said switch and battery load regulator being activated by said means for monitoring energy conducted by said input power source.

2. An apparatus for delivering, monitoring and conserving power to an energy demanding device having a variety of individualized components, said individualized components including a random access memory, said apparatus comprising:

at least one input power source;
means for monitoring energy conducted by said input power source;
input power delivery means for delivering energy from said input power source to said energy demanding device;
a secondary power source;
means for monitoring energy conducted by said secondary power source;
secondary power delivery means for delivering energy from said secondary power source to said energy demanding device;
means for switching from said input power delivery means to said secondary power delivery means and for switching from said secondary power delivery means to said input power delivery means as directed by said input power source monitoring means;
means for conserving energy conducted by said secondary power source to said energy demanding device by selectively terminating energy flow to said variety of individualized components when said secondary power source powers said energy demanding device; and
means for terminating all energy flow when said secondary power source monitoring means determines that energy conducted by said secondary power source fails to meet preset threshold values;
said means for conserving energy further comprising means for preserving data stored in said random access memory until all energy flow is terminated by selectively terminating energy flow to said variety of individualized components other than said random access memory when said secondary power source powers said energy demanding device while maintaining energy flow to said random access memory;
wherein said means for conserving energy comprises:
multiple power delivery conduits, each of said conduits separately directed to said variety of individualized components of said energy demanding device; and
means for selectively terminating energy flow through said power delivery conduits.

3. The apparatus according to claim 2 wherein said means for selectively terminating energy flow comprises switches, one of said switches in line with one of said power delivery conduits, said switch severing or completing energy flow through one of said power delivery conduits when said means for conserving energy determines energy levels require reduced or increased flow.

4. An apparatus for delivering, monitoring and conserving power to an energy demanding device having a variety of individualized components, said apparatus comprising:
at least one input power source;
means for monitoring energy conducted by said input power source;
input power delivery means for delivering energy from said input power source to said energy demanding device;
a secondary power source, said secondary power source comprising batteries;
means for monitoring energy conducted by said secondary power source;
secondary power delivery means for delivering energy from said secondary power source to said energy demanding device;
means for switching from said input power delivery means to said secondary power delivery means and for switching from said secondary power delivery means to said input power delivery means as directed by said input power source monitoring means;
means for conserving energy conducted by said secondary power source to said energy demanding device by terminating energy flow to selected ones of said variety of individualized components when said secondary power source powers said energy demanding device; and
means for terminating all energy flow when said secondary power source monitoring means determines that energy conducted by said secondary power source fails to meet preset threshold values;
wherein said means for terminating all energy flow further comprises a battery cut-off relay, said means for conserving energy activating said cut-off relay when said batteries have insufficient power to energize any of said individualized components of said energy demanding device, and a means for boosting energy flow, said energy boosting means required to actuate said battery cut-off relay when said batteries have insufficient power to energize any of said individualized components of said energy demanding device.

5. For an energy demanding device having a variety of individualized components, a method for providing energy to said energy demanding device when input power to said device fails, said method comprising the steps of:
monitoring said input power to said energy demanding device;
delivering said input power to said energy demanding device when said input power meets preset threshold values;
switching from said input power to a secondary power source when said input power fails to meet preset threshold values;
monitoring said secondary power source;
conserving said secondary power source when said input power fails by selectively de-energizing said individualized components of said energy demanding device, said step of conserving said secondary power source comprising the steps of operating in reserve mode wherein said individualized components of said energy demanding device receive energy from said secondary power source, shifting to standby mode wherein less of said individualized components of said energy demanding device receive energy from said secondary power source, and degenerating to dormant mode when only sufficient energy remains within said secondary power source to energize a random access memory and a real time clock;
terminating energy flow from said secondary power source when said secondary power source fails to meet preset threshold values; and
returning to reserve mode from standby mode when one of said individualized components receiving energy from said secondary power source in standby mode generates an interrupt signal.

6. A computer network system having at least one computer system operable therein, said computer system having a plurality of components interconnected by a system bus for transferring information between said components and an input power means for supplying energy to said system, said computer network system comprising:
a system manager comprising a variety of individualized components, said system manager monitoring information transfers along said system bus and processing said information transfers to determine operating conditions within said computer network system;
a power supply operable in one of a discrete number of power modes;
said power supply operably connected to said system manager;
a secondary power source operably connected to said system manager, said secondary power source engaged by said power supply when input power to said computer system fails to meet a first energy level, said secondary power source comprising a battery;
means, operably connected to said system manager and said power supply, for selectively directing said power supply to operate in one of said power modes based upon said operating conditions within said computer network system determined by said system manager, said means for selectively directing said power supply to operate in one of said power modes comprising a power mode controller, said power mode controller monitoring energy within said battery and said input power, and a battery load regulator for initiating battery power upon failure of said input power, said power mode controller selectively switching some of said individualized components of said system manager on and off based upon energy levels available from either said battery or said input power means and said operating conditions within said computer network system determined by said system manager;

said power mode controller maintaining power to a static random access memory housed within said system manager in all power modes, said power mode controller thereby saving information collected by said system manager and information transferred to said memory from said network system;

a means for terminating all energy flow from said battery when said power mode controller determines said battery fails to contain a threshold energy level, said means for terminating all energy flow comprising:

a battery cut-off relay, said battery cut-off relay controlled by said power mode controller;

means for boosting energy required to actuate said battery cut-off relay when said batteries have insufficient power; and said static random access memory also losing power upon termination of all energy flow.

7. For an energy demanding device having a variety of individualized components, a method for providing energy to said energy demanding device when input power to said device fails, said method comprising the steps of:

monitoring said input power to said energy demanding device;

delivering said input power to said energy demanding device when said input power meets preset threshold values;

switching from said input power to a secondary power source when said input power fails to meet preset threshold values;

monitoring said secondary power source;

conserving said secondary power source when said input power fails by selectively de-energizing said individualized components of said energy demanding device, said step of conserving said secondary power source comprising the steps of operating in reserve mode wherein said individualized components of said energy demanding device receive energy from said secondary power source, shifting to standby mode wherein less of said individualized components of said energy demanding device receive energy from said secondary power source, and degenerating to dormant mode when only sufficient energy remains within said secondary power source to energize a random access memory and a real time clock;

terminating energy flow from said secondary power source when said secondary power source fails to meet preset threshold values, said step of terminating energy flow further comprising the steps of:

switching a secondary cut-off relay to off position; and boosting energy from said secondary power source when switching said secondary cut-off relay;

wherein the step of conserving said secondary power source when said input power fails by selectively energizing said individualized components of said energy demanding device further comprises the steps of:

operating in reserve mode wherein a majority of said individualized components of said energy demanding device receive energy from said secondary power source;

shifting to standby mode wherein less of said individualized components of said energy demanding device receive energy from said secondary power source; and degenerating to dormant mode when only sufficient energy remains within said secondary power source to energize a random access memory and a real time clock.

8. For a computer system manager powered by an external power source connected to said computer system manager by a power line, said computer system manager having an internal power source and a plurality of interconnected components, said interconnected components managing a computer system operably connected thereto by processing information collected regarding the operation of said computer system and determining alert conditions from said processed information, a method of controlling operation of said computer system manager during interruptions of power supplied by said external power source, comprising the steps of:

operating said computer system manager in a first operating mode in which said components of said computer system manager are powered by said external power source;

switching said computer system manager from said first operating mode to a second operating mode in which said components are powered by said internal power source when said power received from said external power source is interrupted;

switching said computer system manager from said second operating mode to a third operating mode in which only selected ones of said components are powered by said internal power source when said computer system manager determines that an alert condition is present and transmits an alert to a remote location, said selected ones of said components powered in said third operating mode including memory, clock and external interface components.

9. A method of controlling operation of said computer system manager during interruptions of power supplied by said external power source according to claim 8 and further comprising the step of:

switching said computer system manager from said third operating mode in which said memory, clock and external interface components are powered by said internal power source to said second operating mode when said computer system manager receives an acknowledgement of said alert from said remote location.

10. A method of controlling operation of said computer system manager during interruptions of power supplied by said external power source according to claim 8 and further comprising the step of:

switching said computer system manager from either said second operating mode or said third operating mode in which said memory, clock and external interface components are powered by said internal power source to a fourth operating mode in which said memory and clock components are powered by said internal power source when said internal power source drops below a first energy level.

11. A method of controlling operations according to claim 10 and further comprising the step of switching said computer system manager from said fourth operating mode to a fifth operating mode in which said internal power source is disconnected from said computer system manager when said internal power source drops below a second energy level.

12. A method of controlling operations according to claim 11 and further comprising the step of switching said computer system manager from said second, third, fourth or fifth operating mode to said first operating mode when the supply of power from said external power source is restored.

13. A computer system manager for managing a computer system, comprising:
- a system bus;
- a processor subsystem for processing information and determining alerts;
- a storage subsystem for storing data processed by said processor subsystem;
- a computer system manager interface for operably connecting said computer system and said processor subsystem for receiving data and power from said computer system;
- a communications subsystem for transmitting alerts determined by said processor subsystem to an external location;
- a power source operable in a plurality of power modes, said power source including first and second power supplies;
- a power mode controller for selectively directing said power source to operate in one of said plurality of power modes;
- said processor subsystem, said communications subsystem, said storage subsystem, said power source, and said power mode controller interconnected by said system bus;
- said plurality of power modes including a first power mode in which said power mode controller and said processor, communications and storage subsystems are powered by said first power supply, a second power mode in which said power mode controller and said processor, communication and storage subsystems are powered by said second power supply and a third power mode in which said power mode controller and said communication and storage subsystems are powered by said second power supply;
- said power mode controller further comprising:
  - means for switching between said first power mode and said second power mode; and
  - means for switching between said second power mode and said third power mode.

14. A computer system manager according to claim 13 wherein said plurality of power modes further comprises a fourth power mode in which said storage subsystem is powered by said second power supply and wherein said power mode controller further comprises means for switching between either said second or third power modes and said fourth power mode.

15. A computer system manager according to claim 14 wherein said plurality of power modes further comprises a fifth power mode in which said power source is disconnected from said system bus and wherein said power mode controller further comprises means for switching between said fourth power mode and said fifth power mode.

16. A computer system manager according to claim 15 wherein said power mode controller further comprises means for switching between said first and third power modes.

17. A computer system manager according to claim 16 and further comprising means for switching from said fourth mode or said fifth modes to said first mode.

* * * * *

UNITED STATES PATENT AND TRADEMARK OFFICE
CERTIFICATE OF CORRECTION

PATENT NO. : 5,283,905
DATED : February 1, 1994
INVENTOR(S) : Said S. Saadeh, et al.

It is certified that error appears in the above-indentified patent and that said Letters Patent is hereby corrected as shown below:

Column 14, line 8 [page 24, lines 12, 13] "Host Power is Bad and ReSerVe-PoWeR" should be -- Host Power is Bad and ReSerVe-PoWeR --

Signed and Sealed this

Twenty-eight Day of March, 1995

*Attest:*

BRUCE LEHMAN

*Attesting Officer*     *Commissioner of Patents and Trademarks*